(12) United States Patent
O'Keefe

(10) Patent No.: US 8,357,448 B2
(45) Date of Patent: Jan. 22, 2013

(54) IDENTIFICATION DEVICE AND METHOD

(75) Inventor: Eoin S O'Keefe, Malvern (GB)

(73) Assignee: Qinetiq Limited, London (GB)

( * ) Notice: Subject to any disclaimer, the term of this patent is extended or adjusted under 35 U.S.C. 154(b) by 1289 days.

(21) Appl. No.: 11/659,189

(22) PCT Filed: Jan. 27, 2005

(86) PCT No.: PCT/GB2005/000317
§ 371 (c)(1),
(2), (4) Date: Feb. 2, 2007

(87) PCT Pub. No.: WO2006/016094

PCT Pub. Date: Feb. 16, 2006

(65) Prior Publication Data
US 2008/0308637 A1 Dec. 18, 2008

(30) Foreign Application Priority Data

Aug. 13, 2004 (GB) .................................. 0418111.1

(51) Int. Cl.
B32B 7/02 (2006.01)
G02B 5/22 (2006.01)
F21V 9/04 (2006.01)

(52) U.S. Cl. ........ 428/216; 428/212; 428/220; 428/457; 359/360

(58) Field of Classification Search .................. 359/350, 359/359–361
See application file for complete search history.

(56) References Cited

U.S. PATENT DOCUMENTS

| 3,758,193 | A | * | 9/1973 | Tung ............................ 359/359 |
| 4,495,239 | A | | 1/1985 | Pusch et al. |
| 4,970,389 | A | | 11/1990 | Danforth et al. |
| 2003/0076582 | A1 | * | 4/2003 | Phillips et al. ................ 359/350 |
| 2003/0082975 | A1 | | 5/2003 | Harata et al. |
| 2003/0104206 | A1 | | 6/2003 | Argoitia et al. |
| 2004/0048172 | A1 | | 3/2004 | Fischer |
| 2004/0068046 | A1 | | 4/2004 | Hugo |

FOREIGN PATENT DOCUMENTS

DE 78 03 894 4/1979

(Continued)

OTHER PUBLICATIONS

Dobrowolski, J.A. "Handbook of Optics: vol. I Fundamentals, Techniques, and Design", (ed. Bass et al.). McGraw-Hill, (1995); Ch. 42, pp. 42.3, 42.9-42.14.*
"3M(R) Reflectivity". Published 2004.*
International Search Report for PCT/GB2005/000317 mailed Jun. 1, 2005.
UK Search Report for GB 0418111.1, date of search Jan. 11, 2005.

Primary Examiner — Maria Veronica Ewald
Assistant Examiner — Prashant J Khatri
(74) Attorney, Agent, or Firm — Nixon & Vanderhye P.C.

(57) ABSTRACT

An identification device for marking an article, the identification device having a low emmissivity at thermal infrared wavelengths and comprising a plurality of layers including a first layer arranged to be substantially transmissive at thermal infrared wavelengths and substantially absorbing at at least one visible wavelength so as to impart a visible coloration thereto, and a second layer arranged as a specular reflector at thermal infrared wavelengths. A method for marking article, in particular a vehicle with said identification device.

18 Claims, 4 Drawing Sheets

FOREIGN PATENT DOCUMENTS

| | | |
|---|---|---|
| DE | 28 56 279 | 2/1980 |
| DE | 34 45 401 | 6/1986 |
| EP | 1 219 684 | 7/2002 |
| GB | 1 605 187 | 3/1983 |
| GB | 2 320 902 | 7/1998 |
| JP | 03-258592 | 11/1991 |
| JP | 09-234976 | 9/1997 |
| JP | 10-171955 | 6/1998 |
| WO | 89/07232 | 8/1989 |
| WO | 97/21186 | 6/1997 |

* cited by examiner

IDENTIFICATION DEVICE AND METHOD

This application is the U.S. national phase of international application PCT/GB2005/000317 filed 27 Jan. 2005, which designated the U.S. and claims benefit of GB 0418111.1 filed 13 Aug. 2004, the entire contents of each of which are hereby incorporated by reference.

The present invention relates to an identification device, and in particular to an optical identification device having spectrally selective reflectivity in the visible, near infrared and thermal infrared wavebands. The invention also relates to a method for marking an item with an identification device.

The present identification device and method are particularly, but not exclusively, applicable to vehicles or other structures to aid their identification. The invention enables unambiguous identification using visible, near infrared and thermal Infrared imaging techniques in combination or isolation.

By way of background to the present invention, as thermal Infrared (IR) imaging technology matures and ownership costs decrease, there is a trend to equip a greater proportion of airborne surveillance vehicles, such as police helicopters, with visible band, night vision systems and thermal IR cameras. These cameras are used for tracking vehicles on the ground, to aid in pursuit of villains in vehicles and on foot but also in direction and co-ordination of other emergency service vehicles as the occasion arises. These functions rely on unambiguous identification and tracking of police and the other emergency service vehicles. In the visible band this is achieved by dark markings with high contrast (light) backgrounds on the roof of vehicles, in some cases this contrast is accentuated through the use of retro-reflective boarders which can be illuminated from the tracking aircraft, using for example Nightsun® searchlights.

In some instances darker and mid coloured shades are used for vehicles, in this case the required high visual contrast is maintained by the use of a white identification mark, sometimes retroreflective, on a dark (preferably black) background. The image contrast is reliant on a suitable difference in reflectivity of the marking materials and on illumination at appropriate wavelengths and from an appropriate direction. The form of identification most frequently used by the UK Police Force is to display a number of letters, numerics and shapes such as squares circles and triangles etc. on the roof of a vehicle. The letters are typically 300 mm high and use the transport alphabet font with a font line width of more than 50 mm.

In low light level conditions 'night vision goggles (NVG)' or other 'night vision' (NV) equipment is used to assist in monitoring the progress of vehicles. However, the identification marks on vehicle roofs are not easily discernible using these methods as the materials used for the lettering and backgrounds have similar reflectivity in the part of the spectrum used by NVG and NV equipment. NVG and NV equipment is sensitive to energy from suitable sources that is reflected from surfaces of an object. The NV equipment then amplifies or 'intensifies' the reflected signal, leading to another customary name for this type of equipment, 'image intensifier'.

When there is no ambient lighting, for example at night, thermal imaging is used to track vehicles. The technique makes use of the fact that all bodies above 0K emit radiation and that in the temperature range usually encountered in inhabited regions of the earth (−20 to +40° C.) this radiation occurs in what is called the thermal infrared. In the Thermal Infrared, conventional visible markings are not obvious. At the wavelength the thermal imagers operate, either 3-5 micrometers (μm) or 8-12 micrometers (μm), the dark and light visually coloured materials have the same low reflectivity. Thus they appear to be the same 'IR colour', as do conventional retro-reflective materials used in vehicle marking liveries. Since both the letters and the background have low reflectivity there is no contrast and the marks are not discernible. Although possible, for operational reasons it is not always preferred to illuminate a vehicle being tracked, for example, this may alert villains to their detection or when a large number of vehicles are being monitored. Thermal imagers are sensitive to energy from suitable sources reflected from the surface of an object and to energy that is emitted from the surface.

Identification devices having thermal properties are known, see for example GB 2,320,902 which describes a display panel incorporating areas having differing thermal emissivities/temperatures (and therefore different 'IR colours'). However, the identification device described in GB 2,320,902 is an active display utilising a heated symbol. The identification device of GB 2,320,902 therefore has the attendant disadvantage that a power source is required to operate the display. Similarly, WO 89/07232 describes a training aid having an electrically heated thermally emissive structure.

In addition to the marking of law enforcement and other civil emergency vehicles, the marking of other vehicles and containers is also of interest to aid in identification and recognition of vehicles for airborne tracking of authorised and unauthorised movement.

It is an object of the invention to provide an identification device and method which mitigate at least some of the disadvantages of conventional indicia and marking methods described above. It is a further object of the invention to provide an identification device and method that can be used to passively and unobtrusively mark an item in both the thermal infrared and near infrared wavebands while being compatible with visual identification and can be used where an item requires such marking for tracking or recognition purposes.

In particular the present identification device and method can be used by the emergency services, more particularly law enforcement agencies, to assist in the recognition of individual vehicles for command and control of ground vehicles from the air. In addition to providing identification marking of vehicles, the identification device of the present invention can assist in the registration of overlay images from different wavebands for data fusion purposes. The technology may have additional applications beyond law enforcement and civil emergencies.

According to a first aspect of the present invention there is now proposed an identification device for marking an article, the identification device having a low emmissivity at thermal infrared wavelengths and comprising a plurality of layers including a first layer arranged to be substantially absorbing at least one visible wavelength so as to impart a visible coloration thereto.

In the interests of clarity, the thermal infrared (TIR) part of the spectrum shall be taken here as 2000 nm to 20000 nm, whereas the visible (VIS) part of the spectrum shall be taken here as 380 nm to 700 nm.

The present identification device is beneficial in that it is detectable both in the visible part of the spectrum and in the thermal infrared part of the spectrum (using suitable imaging equipment). The visible coloration and the low thermal emmissivity provide optical contrast with respect to the article to which the device is applied at visible and thermal infrared wavelengths respectively.

In a preferred embodiment, the identification device has a second layer arranged to be substantially reflective at thermal infrared wavelengths. For example, the second layer may be arranged to have a reflectivity in the range 0.7-0.99 at thermal infrared wavelengths. Advantageously, the second layer is arranged as a specular reflector.

The second layer offers a further benefit of increasing the optical contrast at thermal infrared wavelengths between the identification device and the article to which it is applied. The second layer is able to increase the optical contrast in this manner by reflecting ambient thermal infrared, for example cold sky thermal infrared radiation.

Preferably, the first layer is arranged to be substantially transmissive at thermal infrared wavelengths.

Conveniently, the first layer is arranged to be substantially absorbing throughout substantially the whole of the visible spectrum such that the first layer appears visually dark to the unaided eye. Where this is the case, the identification device may have a reflectivity of less than 0.2 at visible wavelengths. In particular, the optical filter may be arranged to have a low reflectivity throughout substantially the whole of the visible spectrum such that the first layer appears visually black to the unaided eye. Where this is the case, the identification device may have a reflectivity of less than 0.15 at visible wavelengths.

The first layer may comprise a plurality of polychromatic dyes preferably in a polymer host.

In another embodiment, the second layer comprises a metallic reflector. Preferably, the second layer includes a metal comprising at least one of aluminium, chromium, nickel, gold, copper, silver and titanium.

The metal may comprise aluminium having a thickness in the range 20-100 nm. In addition, or alternatively, the metal comprises chromium having a thickness in the range 50-200 nm. The metal preferably has a DC resistivity of less than 20 Ohm per square, even more preferably less than 5 Ohm per square.

Typically, the first and second layers are arranged in a stack upon a substrate layer, the substrate layer comprising a polymer film. The sequence of layers is the first colour layer outermost, the second IR reflector layer beneath and the substrate film innermost. In use, the identification device is attached to an article so that the substrate film is preferably in close contact with the article with the first layer outermost and the second layer arranged between the substrate film and the first layer. The substrate layer preferably comprises at least one of polyethylene terephthalate (PET), orientated polypropylene (OPP), biaxially orientated polypropylene (BOPP), and plasticised polyvinyl chloride (PVC). Other substrate materials that can be used will occur to the knowledgeable reader.

Conveniently, the substrate layer has a thickness in the range 20-200 μm.

In another embodiment, the identification device comprises an adhesive layer.

The identification device preferably further comprises an environmental protection layer, for example including a polymer comprising at least one of a polyolefin material, polyethylene, polypropylene, orientated polypropylene (OPP), biaxially orientated polypropylene (BOPP), a cyclic polyolefin material, and a polyolefin/styrene copolymer.

Advantageously, the environmental protection layer has a thickness in the range 5-30 μm.

According to second aspect of the present invention there is now proposed a method for marking an article comprising the step of attaching an identification device according to the first aspect of the invention to said article.

Preferably, the identification device is attached to said article such that, in use, the identification device is inclined to the horizontal at an angle in the range 0° to 40°, even more preferably in the range 0° to 30° to the horizontal; typically 0°, 5°, 10°, 15°, 20°, or 25° to the horizontal.

In a preferred embodiment, the method comprises the further step of applying a covering material to an area of the identification device, the covering material having a different infrared thermal reflectivity to that of the identification device. Preferably, the covering material has a low reflectivity at thermal infrared wavelengths and may comprise at least one of a polymer film, a paint or a visible retro-reflective material.

Advantageously, the article to which the identification device is attached comprises a vehicle, in which case the step of attaching the identification device preferably comprises applying the identification device to an upper surface of the vehicle. In a preferred embodiment, the method comprises the step of applying the identification device to the roof of the vehicle.

According to third aspect of the present invention, there is now proposed an article having an identification device according to the first aspect of the invention attached thereto. Preferably the article comprises a vehicle.

Where the article comprises a vehicle, the identification device is preferably attached to an upper surface thereof, even more preferably the roof of the vehicle. In this arrangement, the identification device is adapted, in use, to reflect ambient thermal radiation, for example sky thermal radiation.

According to a fourth aspect of the present invention, there is now proposed a method for fabricating an identification device comprising the steps of:
(i) depositing a layer of metal on a first surface of a substrate film, and
(ii) depositing upon said metal layer a colour layer having a visible coloration.

Advantageously, the method further comprises the step of:
(iii) depositing upon said colour layer an environmental protection layer.

The method may also comprise the step of:
(iv) depositing an adhesive layer on a second surface of the substrate film.

Where the method comprises the step of depositing an adhesive layer, a further step may comprise applying a releasable backing layer to the adhesive layer.

The step of depositing the metal may comprise at least one of hot foil printing, vacuum deposition, evaporation, coating with an ink or paint containing metal flakes, or direct metal printing.

The step of depositing the colour layer may comprise at least one of coating with a fluid, applying a laminate film, and hot foil printing.

The invention has been described above, without limitation, in terms of a multilayer structure. Notwithstanding the foregoing, the invention may also be thought of in terms of an identification device for an article, the identification device being adapted in use to provide a high contrast marking when applied to said article when viewed at a plurality of visible and non-visible wavelengths.

In this case the identification device preferably has a low emmissivity at thermal infrared wavelengths and comprises an optical filter having a low reflectivity at least one visible wavelength so as to impart a visible coloration thereto.

Advantageously, the optical filter is arranged to have a high reflectivity at thermal infrared wavelengths. In particular, the optical filter may be arranged to have a high specular reflectivity.

Preferably, the optical filter has a reflectivity in the range 0.7-0.99 at thermal infrared wavelengths. Even more preferably, the optical filter also has a high reflectivity at near infrared wavelengths, for example a reflectivity of at least 0.75 at near infrared wavelengths.

Conveniently, the optical filter is arranged to have a low absorption at thermal infrared wavelengths.

Preferably, the optical filter is arranged to have a low reflectivity throughout substantially the whole of the visible spectrum such that the first layer appears visually dark to the unaided eye. Where this is the case, the optical filter may have a reflectivity of less than 0.2 at visible wavelengths. Even more preferably, the optical filter is arranged to have a low reflectivity throughout substantially the whole of the visible spectrum such that the first layer appears visually black to the unaided eye. Where this is the case, the optical filter may have a reflectivity of less than 0.15 at visible wavelengths Advantageously, the optical filter comprises a plurality of polychromatic dyes preferably in a polymer host.

Preferably, the optical filter comprises a metallic reflector. For example, the optical filter may include a metal comprising at least one of aluminium, chromium, nickel, gold, copper, silver and titanium.

The invention will now be described, by example only, with reference to the accompanying drawings in which.

Figure 3:
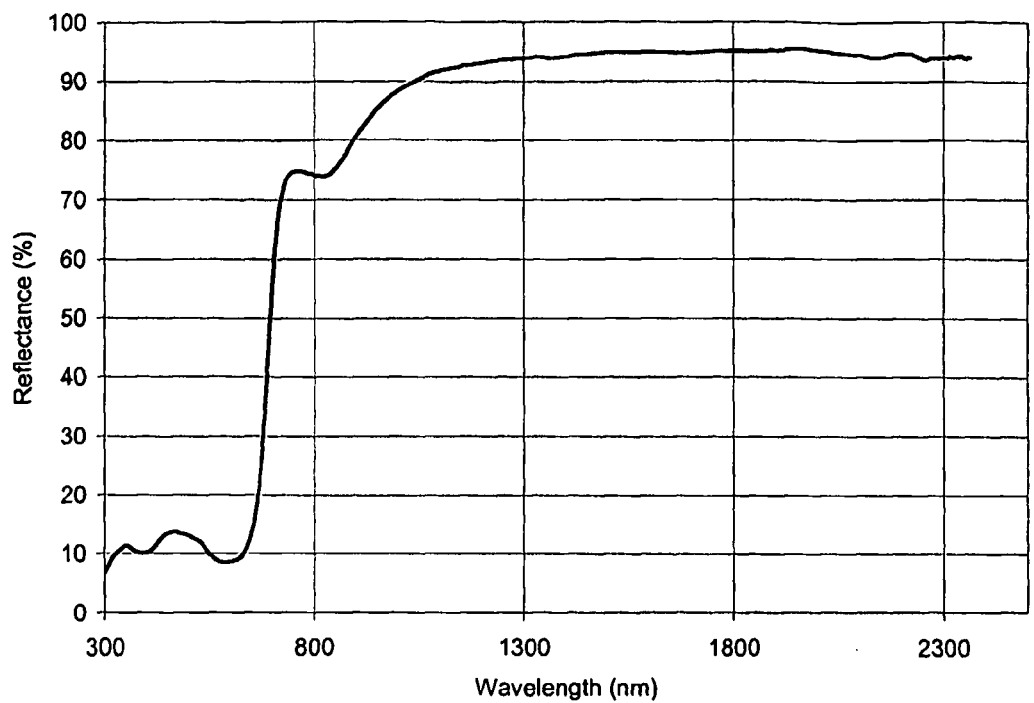

FIG. 3 shows the reflection spectrum between 300 nm and 2500 nm for an identification device according to one embodiment of the present invention. In this embodiment, the identification device comprises an optical filter consisting of a first layer formed by roller coating of a solvent borne polymer host containing a mixture of dyes to form a visually black layer onto a second layer formed by thermal evaporation of a 40 nm thick aluminium layer onto one side of a substrate of polymer film. Subsequently a pressure sensitive adhesive layer was deposited by roller coating a solution of DURO-TAK® pressure sensitive adhesive on the second side of the substrate film to form a black self adhesive visible (VIS) black, near infrared (NIR) reflective, thermal infrared (TIR) reflective marking film.

Figure 4:
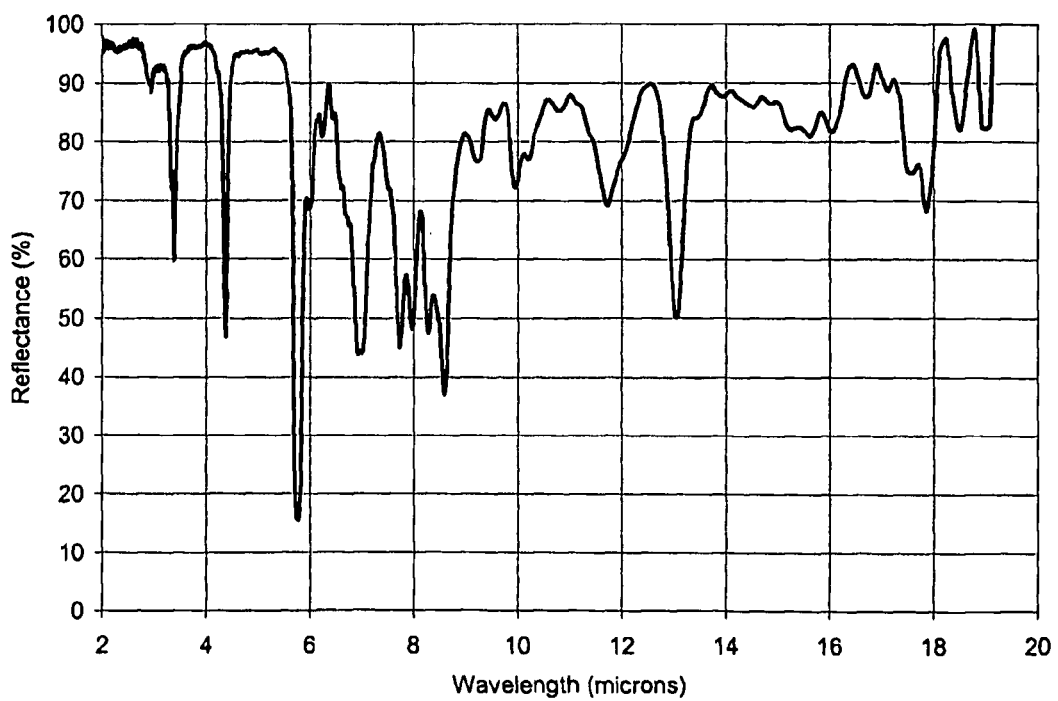

FIG. 4 shows the reflection spectrum between 2 micrometers (μm) and 20 micrometers (μm) for the same identification device referred to above with respect to FIG. 3.

Figure 5:
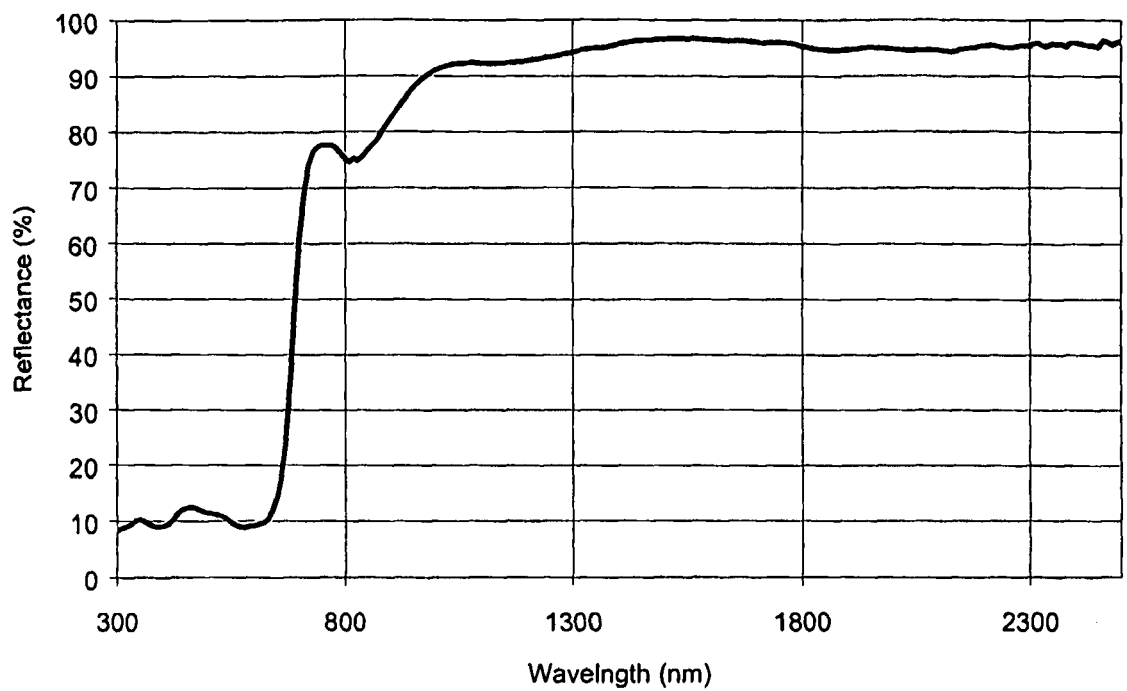

FIG. 5 shows the reflection spectrum between 300 nm and 2500 nm for an identification device according to one embodiment of the present invention. In this embodiment, the identification device comprises an optical filter consisting of an API block printing foil film 299 printed onto Raflatac® self adhesive film to form a self adhesive visible (VIS) black, near infrared (NIR) reflective, thermal infrared (TIR) reflective marking film.

Figure 6:
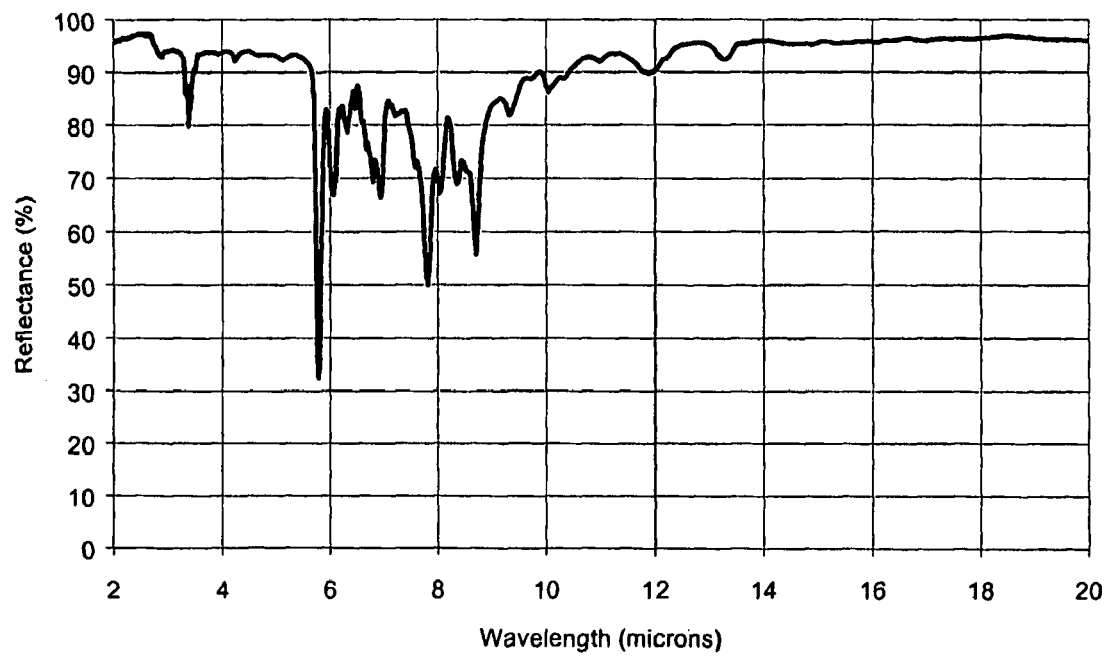

FIG. 6 shows the reflection spectrum between 2 micrometers (μm) and 20 micrometers (μm) for the same identification device referred to above with respect to FIG. 5.

Figure 7:

FIG. 7 shows a thermal image of an emergency services vehicle having conventional identification markings on the roof of the vehicle. The standard livery materials used for the indicia on the vehicle have similar emissivity to that of the paint covering the vehicle bodywork. As a result, liveried and non-liveried vehicles look similar when viewed through a thermal imaging camera.

Figure 8:

FIG. 8 shows a thermal image of an emergency services vehicle having identification markings according to the present invention on the roof of the vehicle. The different emissivities of the identification markings and the paintwork of the vehicle add thermal contrast, thereby improving detection with the thermal camera.

Referring now to a first embodiment of the invention, the present identification device has the property of having low reflectivity (<0.1) throughout the visible (VIS) part of the spectrum, taken here as 380 to 700 nm, i.e. it is visually black. In the near infrared (NIR) part of the spectrum used by NV and NVG, taken here as 700 to 900 nm (NVGs are usually sensitive from 400 to 900 nm, only 780 to 900 nm is in the NIR region), the present identification device is moderately reflective (>0.75). In the thermal infrared (TIR) part of the spectrum, taken here as 2000 to 20000 nm, the present identification device is reflective (0.7 to 0.9).

Typically, although not exclusively, the identification device comprises an optical filter in the form of a film.

Conventional white paints used on vehicles have high reflectivity (>0.9) throughout the VIS part of the spectrum and have low reflectivity (<0.1) in the TIR part of the spectrum. By marking the top of a vehicle coated with conventional white paint with an identification device according to the present invention it is possible to create significant reflection contrast (>0.6 to 0.8) with the surrounding materials in both the VIS and TIR parts of the spectrum.

Coatings conventionally used on vehicles have different reflectivity profiles in the VIS part of the spectrum to give the different visual colours but have low reflectance in the TIR part of the spectrum. To maintain high visible contrast for identification marks on non-white vehicles, a black background with white letters is preferred. To create a similar high contrast identification marking in the TIR the present identification device is used as a background to a conventional low TIR reflective white letter, either retro-reflective or not.

In the NIR part of the spectrum the reflectance of vehicle coatings are variable, usually between low (<0.05) and medium (<0.5). Marking the roof of a vehicle so that it can be identified using NVG and NV equipment can be achieved with the present identification device either on its own or in conjunction with a conventional low reflectivity marking film. Having moderately high (>0.75) reflectivity in the NIR region creates significant contrast to the remainder of a treated vehicle.

By way of explanation of the operation of the present identification device, TIR energy reaching the imaging sensor will be the sum of energy reflected from the environment and energy arising from the surface of the vehicle. Following Kirchoff's Law for an opaque body, the reflectivity ρ of a surface is related to its emissivity ε thus:

$$\epsilon = 1 - \rho$$

That is a surface that has high reflectivity will have low emissivity. The energy arising from a surface at any particular wavelength can be calculated from the product of the black body exitance at that wavelength and the emissivity at that wavelength. At a particular wavelength, a high reflectivity (low emissivity) surface will emit less energy than another surface at the same temperature with a low reflectivity (high emissivity) surface. By using high TIR reflectivity surface coatings the contribution to the observed radiance arising from the direct radiation from the treated surface of the vehicle will be reduced accordingly. In addition, by using a specular high reflectivity material in the identification device on the roof of a vehicle the contribution to the observed radiance viewed from an airborne TIR imager arising from scene reflections will normally be dominated by reflections from the sky. At low view angles, vegetation and other parts of the scene may be reflected. In areas where there are tall buildings close to the vehicles, radiance from these may also be reflected and contribute to the image.

In the majority of situations clear sky radiance is very low compared with the rest of a scene (i.e. it is 'cold'). The only significant TIR sources in the sky are the sun during daylight hours and the moon when present and illuminated by the sun. Both subtend a solid angle of less than 0.5° and so are unlikely to be observed through specular reflection from the top of a vehicle and when they are their high radiance will be equally obvious as 'hot'. Under cloud cover the contrast will be reduced as the underside of the cloud can be significantly warmer than cold clear sky. Cloud is rarely of uniform temperature so in the typical scenario with moving vehicles, and therefore viewing angles, the reflected radiance will be made more obvious by its time-varying nature. Low thermal IR emissivity paint tend to be more diffuse reflectors and will tend to average the reflected radiance over a larger solid angle, as a result the reflected component would be expected to be higher under cloudless conditions reducing the contrast to the high emissivity materials adjoining the low TIR emissivity device.

It is the convention to display thermal imagery as a monochrome grey scale with black representing low thermal energy and white representing high thermal energy. The high TIR reflectivity of the present identification device will predominantly have a combined self emittance and reflectance that is lower than other parts of a marked vehicle or the scene and thus appear black on a grey or white background. Thus an identification device, for example a character or other sign formed in visually dark and Infrared reflective material according to this invention, adhered to the top surface of a white vehicle will appear as a black letter on a white vehicle in both VIS and TIR images. Similarly, a conventional white letter mounted on a black background comprising the present identification device on the top surface of a vehicle will appear as a white letter on a black background in both VIS and TIR imagery.

Figure 1:
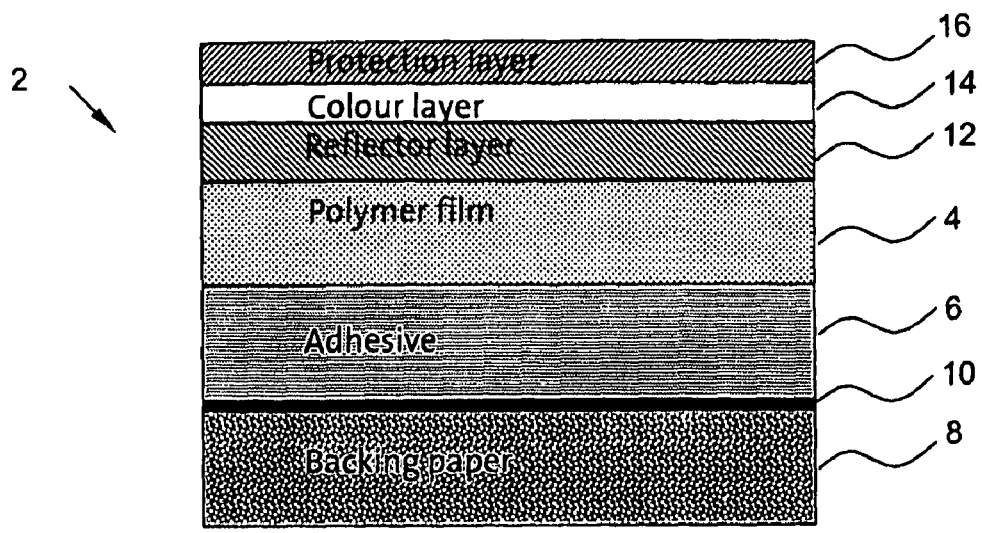
FIG. 1 shows a schematic cross-sectional view through an identification device according to one embodiment of the present invention. The identification device comprises an optical filter having a flexible polymer film substrate coated with a plurality of layers.

Referring now to FIG. 1, an identification device according to one embodiment of the invention consists of a marking film 2 comprises a flexible polymer film substrate 4 coated with a plurality of layers. On one side of the flexible film substrate 4, an adhesive layer 6, is provided so that the composite marking film can be adhered to a vehicle or other structure. It is convenient for the adhesive layer 6 to be covered with another film 8 coated with a 'release layer' 10 to prevent adhesion of the marking film during storage, transportation and shaping before application. Other methods for application to vehicles or other structures will occur to the knowledgeable reader, for example mounting on to magnetic sheet to allow the marking to be temporarily fixed in place. On the other side of the flexible film substrate 4, a layer of metal 12 is deposited to form a metallic reflector. Over the metallic reflector layer 12 a colour layer 14 formed from environmentally robust dyed polymer is deposited. An optional additional environmental protection layer of either a continuous polymer film laminated to the exposed surface of the colour layer or a deposited polymer film is provided where greater mechanical durability is required. The thickness and chemical composition of the layers above the metal reflector 12 have to be carefully controlled to prevent significant absorption of TIR and NIR energy while providing the desired visible colour and environmental protection.

The adhesive 6 is preferably a low initial tack pressure sensitive adhesive (PSA), comprising for example an acrylic PSA, e.g. DURO-TAK® 380-3511 made by the National Starch and Chemical company. Other forms of suitable adhesive will occur to the knowledgeable reader.

The PSA is covered with a release layer 10 coated paper or film 8 until ready for application, for example a cross-linked silicone coated paper.

The support film 4 comprises at least one of the following film forming polymers:—
polyethylene terephthalate (PET) at a thickness of between 20 and 100 micrometers (μm), orientated polypropylene (OPP) at a thickness of between 50 and 125 micrometers (μm), biaxially orientated polypropylene (BOPP) at a thickness of between 50 and 125 micrometers (μm), and plasticised polyvinyl chloride (PVC) at a thickness of between 50 and 200 micrometers (μm).

The reflector layer 12 comprises at least one of the following materials:—
aluminium between 20 and 100 nm thick with a DC resistivity of less than 20 Ohm per square and ideally less than 5 Ohm per square, chromium between 50 and 2000 nm thick with a DC resistivity of less than 20 Ohm per square, and ideally less than 5 Ohm per square.

Alternatively, other IR reflective materials can also be used, including nickel, gold, copper, silver, titanium etc. They may be deposited through any technique which creates the desired high TIR reflective specular finish, most frequently vacuum deposition methods such as evaporation are used. Aluminium is the material of choice, for a low cost material but has limited tolerance to chemical attack from salt and cleaning materials. Chromium is the material of choice for more demanding chemical environments. Alternatively the reflector layer 12 is applied using a printing technique, for example hot foil printing.

The colour layer 14 is formed from the following types of materials:—
a solvent soluble film forming polymer (or lacquer) such as an acrylic or other film forming polymer such as UV initiated or cross-linked materials. Example lacquer materials are: acrylic resins such as poly methyl, ethyl or butyl acrylates. A specific example being Elvacites 2041 polymer binder (produced by ICI Acrylics).

The lacquer is deposited by roller coating a solvated solution of the polymer and force drying/curing.

As a specific example, a colour layer 14 may be formed by roller coating of a solvent borne polymer host containing a mixture of dyes to form a visually black layer onto a second layer formed by thermal evaporation of a 40 nm thick aluminium layer 12 onto one side of a substrate of polymer film 4. Subsequently a pressure sensitive adhesive layer may be deposited by roller coating a solution of DURO-TAK® pressure sensitive adhesive on the second side of the substrate film to form a black self adhesive visible (VIS) black, near infrared (NIR) reflective, thermal infrared (TIR) reflective marking film. The reflection spectrum between 300 nm and 2500 nm of a marking film produced in this manner is shown in FIG. 3. The reflection spectrum between 2 micrometers (μm) and 20 micrometers (μm) of a marking film produced in this manner is shown in FIG. 4.

In the colour-layer polymer a selection of dyes are incorporated, in some cases other materials such as solid pigments, oxidation or UV stabilisation additives, matting agents may be added to alter the appearance of the final film. Usually the dyes are chosen to have minimum absorption in the TIR and NIR bands of interest while maximising their absorption in the visible band.

Dark colours in inks, stains and paints are usually achieved by using a strong broad band absorbing material such as carbon black, however these materials are not preferred for this application.

Figure 2:
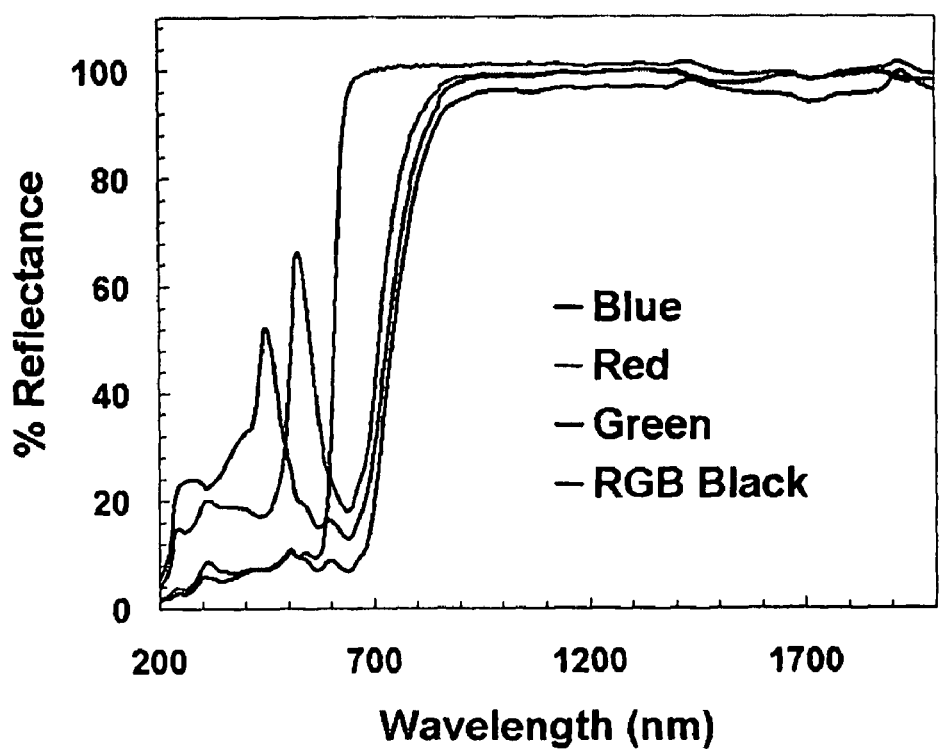
FIG. 2 shows reflection spectra of three dyes which may be combined in the colour layer of the identification device shown in FIG. 1 to give a black appearance.

Dark colours are achieved by mixing 'polychromatic dyes' where a number of dyes with narrow absorption are blended to form a dark colour. Referring to FIG. 2, the reflection spectrum of three dyes and that of said dyes when combined as a black dye are shown; note that the dyes do not absorb significantly above 800 nm. Dyes that may be used for creating a polychromatic black may be chosen from the following types of dyes:

Desirable dyes include azo, xanthene and anthraquinone dyes. A specific example being a mixture of solvent dye blue 36, solvent dye red 24 and solvent dye yellow 56 available from Town End (Leeds) Plc, Silvercourt, Intercity way, Leeds.

The thickness of the colour layer 14 is controlled to prevent absorption of the emitted TIR, and reflected NIR and TIR, energy arising at reflector layer 12. The colour layer 14 has to be thick enough to carry the required amount of absorbing dyes without becoming too fragile either from the concentration of dye species or by the thickness of the coating. The preferred thickness of the colour layer 14 is between 0.5 and 20 micrometers (μm).

The colour layer 14 is kept to a minimum thickness as described above. Additional durability can be added through by the addition of an optional (colourless) environmental protection layer 16. This polymer layer 4 is chosen for a balance of durability, chemical resistance and VIS, NIR and TIR transparency. The environmental protection coating 16 may be loaded with UV absorbing materials and other degradation stabilising additives to slow the on-set of oxidation and UV damage of either the protection layer 16 or of the dyes and colour layer polymer. The environmental protection polymer 16 can be deposited as another solvated coating by roller or spray coating followed by a curing schedule or by laminating a thin film of a suitable polymer. Alternatively, other techniques are used, for example hot foil printing.

Polymers that can be used for this protection layer can be chosen from the polyolefin family, such as polyethylene at a thickness of 5 to 30 micrometers (μm), polypropylene (including OPP and BOPP) at a thickness of 5 to 20 micrometers (μm), cyclic polyolefins such as Arton® (JSR corporation) at a thickness of 5 to 20 micrometers (μm), and polyolefin/styrene copolymers such as Kraton® (Shell fine chemicals) at a thickness of 5 to 20 micrometers (μm).

Block foil printing methods provide alternative fabrication techniques for applying the reflector, colour layer and optional environmental protection layer are. As a specific example, API block foil printing film 299 can be hot foil printed onto Raflatac® self adhesive film to form a black self adhesive visible black NIR reflective, TIR reflective marking film. The reflection spectrum between 300 and 2500 nm of a film produced in this manner is shown in FIG. 5. The reflection spectrum between 2 and 20 micrometers (μm) of a marking film produced in this manner is shown in FIG. 6.

Alternative techniques can be used to apply the colour layer and such techniques will occur to the knowledgeable reader.

A practical demonstration of the efficacy of the present identification devices is illustrated in FIGS. 7 and 8. FIG. 7 shows a thermal image of an emergency services vehicle having conventional identification markings on the roof of the vehicle. The standard livery materials used for the indicia on the vehicle have similar emissivity to that of the paint covering the vehicle bodywork. As a result, liveried and non-liveried vehicles look similar when viewed through a thermal imaging camera. By way of comparison, FIG. 8 shows a thermal image of an emergency services vehicle having identification markings according to the present invention on the roof of the vehicle. The different emissivities of the identification markings and the paintwork of the vehicle add thermal contrast, thereby improving detection of the identification markings with the thermal camera.

The invention claimed is:

1. An identification device for marking an article, the identification device having a low emissivity relative to an emissivity of said article at thermal infrared wavelengths, said device comprising an optical filter configured to have direct reflectivity at thermal infrared wavelengths, said filter comprising a plurality of layers including:
   a first layer arranged to be absorbing throughout substantially the whole of the visible spectrum such that the first layer appears visually dark to the unaided eye;
   a second layer arranged to be reflective at thermal infrared wavelengths; and
   a substrate layer comprised of a polymer film, wherein the first and second layers are arranged in a stack upon said substrate layer such that the second layer is disposed between the first layer and the substrate layer, wherein the first layer is arranged to be substantially transmissive at thermal infrared wavelengths.

2. The identification device according to claim 1 wherein the first layer comprises a plurality of polychromatic dyes in a polymer host.

3. The identification device according to claim 1 wherein the second layer comprises a metallic reflector.

4. The identification device according to claim 3 wherein the second layer includes a metal comprising at least one of aluminium, chromium, nickel, gold, copper, silver and titanium.

5. The identification device according to claim 4 wherein the metal comprises aluminium having a thickness in the range 20-100 nm.

6. The identification device according to claim 4 wherein the metal comprises chromium having a thickness in the range 50-200 nm.

7. The identification device according to claim 4 wherein the metal has a DC resistivity of less than 20 Ohm per square.

8. The identification device according to claim 7 wherein the metal has a DC resistivity of less than 5 Ohm per square.

9. The identification device according to claim 1 wherein the substrate layer has a thickness in the range 20-200 μm.

10. An article having an identification device according to claim 1 attached thereto.

11. An identification device for marking an article, the identification device having a low emissivity relative to an emissivity of said article at thermal infrared wavelengths, said device comprising an optical filter configured to have a high specular reflectivity at thermal infrared wavelengths relative to specular reflectivity at other wavelengths, said filter comprising a plurality of layers including:
   a first layer arranged to be absorbing throughout substantially the whole of the visible spectrum such that the first layer appears visually dark to the unaided eye;
   a second layer arranged to be a specular reflector at thermal infrared wavelengths; and
   a substrate layer comprised of a polymer film, wherein the first and second layers are arranged in a stack upon said substrate layer such that the second layer is disposed between the first layer and the substrate layer, wherein the first layer is arranged to be substantially transmissive at thermal infrared wavelengths.

12. An identification device for marking an article, the identification device having a low emissivity relative to an emissivity of said article at thermal infrared wavelengths, said device comprising an optical filter configured to have a direct reflectivity at thermal infrared wavelengths, said filter consisting of:
- a first layer arranged to be absorbing throughout substantially the whole of the visible spectrum such that the first layer appears visually dark to the unaided eye;
- a second layer arranged to be a direct reflector at thermal infrared wavelengths; and
- a substrate layer comprised of a polymer film, wherein the first and second layers are arranged in a stack upon said substrate layer such that the second layer is disposed between the first layer and the substrate layer, wherein the first layer is arranged to be substantially transmissive at thermal infrared wavelengths.

13. An identification device for marking an article, the identification device having a low emissivity relative to an emissivity of said article at thermal infrared wavelengths, said device comprising an optical filter configured to have direct reflectivity at thermal infrared wavelengths, said filter comprising a plurality of layers including:
- a first layer arranged to be absorbing throughout substantially the whole of the visible spectrum such that the first layer appears visually dark to the unaided eye;
- a second layer arranged to be reflective at thermal infrared wavelengths; and
- a substrate layer comprised of a polymer film, wherein the first and second layers are arranged in a stack upon said substrate layer such that the second layer is disposed between the first layer and the substrate layer, wherein the first layer comprises a plurality of polychromatic dyes in a polymer host.

14. A method for marking an article, said method comprising the steps of:
- attaching an identification device to said article, said identification device having a low emissivity relative to an emissivity of said article at thermal infrared wavelengths, said device comprising an optical filter configured to have direct reflectivity at thermal infrared wavelengths and to have a higher reflectivity at thermal infrared wavelengths relative to reflectivity at other infrared wavelengths, said filter comprising a plurality of layers including:
  - a first layer arranged to be absorbing at at least one visible wavelength so as to impart a visible coloration to said article;
  - a second layer arranged to be reflective at thermal infrared wavelengths; and
  - a substrate layer comprised of a polymer film, wherein the first and second layers are arranged in a stack upon said substrate layer, such that the second layer is disposed between the first layer and the substrate layer; and
- obtaining a thermal image of the identification device, wherein the first layer is arranged to be substantially transmissive at thermal infrared wavelengths.

15. The method for marking an article according to claim 14 comprising the further step of applying a covering material to an area of the identification device, the covering material having a different infrared thermal reflectivity to that of the identification device.

16. The method according to claim 15 wherein the covering material comprises at least one of a polymer film, a visibly retroreflective film and a paint.

17. The method for marking an article according to claim 14, the article comprising a vehicle and wherein the step of attaching the identification device comprises applying the identification device to an upper surface of the vehicle.

18. The method for marking an article according to claim 17 comprising applying the identification device to the roof of the vehicle.

* * * * *